(12) United States Patent
Smith et al.

(10) Patent No.: US 7,149,432 B1
(45) Date of Patent: Dec. 12, 2006

(54) METHOD AND APPARATUS FOR EQUALIZATION ACROSS PLURAL DATA CHANNELS

(75) Inventors: Roland A. Smith, Nepean (CA); Kim B. Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1049 days.

(21) Appl. No.: 09/722,339

(22) Filed: Nov. 28, 2000

(51) Int. Cl.
*H04B 10/00* (2006.01)

(52) U.S. Cl. .................... 398/158; 398/43; 398/45; 398/46; 398/47; 398/49; 398/81; 398/50; 398/52; 398/147; 398/159; 398/53; 398/55; 398/56; 398/75; 398/79; 398/98; 398/182; 398/202; 398/192; 398/193; 398/194; 398/186; 398/141; 370/388; 370/389; 370/387; 370/386; 370/355

(58) Field of Classification Search .................. 398/49, 398/50, 56, 57, 42, 45, 51, 55, 58, 79, 75, 398/54, 25, 26, 27, 192, 193, 194, 43, 46, 398/47, 81, 52, 147, 53, 158, 159, 91, 149, 398/98, 182, 202, 183, 214, 186, 141; 370/388, 370/389, 387, 386, 355, 535, 536, 537–545, 370/385

See application file for complete search history.

(56) References Cited

U.S. PATENT DOCUMENTS

| | | | | |
|---|---|---|---|---|
| 5,175,640 A * | 12/1992 | Eng et al. | ..................... | 398/47 |
| 5,351,146 A * | 9/1994 | Chan et al. | ................... | 398/58 |
| 5,940,551 A * | 8/1999 | Oberg | ........................ | 385/17 |
| 5,953,143 A * | 9/1999 | Sharony et al. | ............... | 398/46 |
| 6,067,180 A | 5/2000 | Roberts | ...................... | 359/181 |
| 6,078,597 A | 6/2000 | Feuer | ............................ | 372/6 |
| 6,091,538 A | 7/2000 | Takeda et al. | .............. | 359/341 |
| 6,091,541 A | 7/2000 | Yoon | .......................... | 359/341 |
| 6,097,535 A | 8/2000 | Terahara | ..................... | 359/341 |
| 6,101,012 A | 8/2000 | Danagher et al. | ........... | 359/127 |
| 6,104,848 A | 8/2000 | Toyohara et al. | ............. | 385/24 |
| 6,108,470 A | 8/2000 | Jin et al. | ...................... | 385/37 |
| 6,115,156 A | 9/2000 | Otani et al. | ................. | 359/124 |
| 6,185,021 B1 * | 2/2001 | Fatehi et al. | ................... | 398/9 |
| 6,229,824 B1 * | 5/2001 | Marko | ........................ | 370/477 |
| 6,433,904 B1 | 8/2002 | Swanson et al. | ........... | 359/133 |
| 6,452,707 B1 * | 9/2002 | Puc et al. | .................... | 398/158 |
| 6,519,062 B1 * | 2/2003 | Yoo | ............................. | 398/49 |
| 6,535,313 B1 * | 3/2003 | Fatehi et al. | ................ | 398/101 |
| 6,545,784 B1 * | 4/2003 | Okazaki et al. | .............. | 398/50 |
| 6,625,176 B1 * | 9/2003 | Amann et al. | ............. | 370/503 |
| 6,628,673 B1 * | 9/2003 | McFarland et al. | ......... | 370/481 |
| 6,665,495 B1 * | 12/2003 | Miles et al. | ................... | 398/54 |

(Continued)

*Primary Examiner*—Hanh Phan
(74) *Attorney, Agent, or Firm*—Kent Daniels; Ogilvy Renault LLP

(57) ABSTRACT

Optical equalization across N (an integer, N>1) channels of a multi-channel link of a communications network, is accomplished by averaging effects of optical performance variations within each of the M (an integer, M>1) parallel data signals. At a transmitting end node of the link, each one of the M data signals are distributed across the N channels of the link. Thus a substantially equal portion of each data signal is conveyed through the link in each one of the N channels. At a receiving end node of the link, respective bit-streams received over the N channels to are processed recover the M data signals. As a result, bit error rates of the bit-streams received through each channel are averaged across the M data signals, all of which therefore have a substantially equal aggregate bit error rate.

47 Claims, 3 Drawing Sheets

U.S. PATENT DOCUMENTS 6,721,304 B1 * 4/2004 Rasanen ..................... 370/347
6,747,971 B1 * 6/2004 Hughes et al. .............. 370/387
6,754,211 B1 * 6/2004 Brown ....................... 370/389
2002/0114358 A1 * 8/2002 Roberts et al. ............. 370/529

* cited by examiner

METHOD AND APPARATUS FOR EQUALIZATION ACROSS PLURAL DATA CHANNELS

CROSS-REFERENCE TO RELATED APPLICATIONS

This is the first application filed for the present invention.

MICROFICHE APPENDIX

Not Applicable.

TECHNICAL FIELD

The present invention relates to communications networks, and in particular to a method and apparatus for signal equalization across multiple data channels of an optical communications network.

BACKGROUND OF THE INVENTION

In the modern communications network space, signal reach and spectral density are important factors in overall network cost. Assuming other factors to be equal, increases in either signal reach or spectral density tend to reduce overall network cost and are thus very attractive to network service providers.

Signal reach is the distance that an optical signal can be transmitted through a fiber, before conversion to electronic form is required to perform signal regeneration. Using suitable optical amplifiers and optical processing techniques, between 10 and 20 fiber spans (of 40–80 km each) can be traversed by an optical signal before optical/electrical conversion and regeneration are required.

Spectral density, which is normally expressed in terms of bits/sec/Hz (b/s/Hz), is a measure of the extent to which the theoretical maximum bandwidth capacity of an optical channel is utilized. This value is generally determined by dividing the line rate (in bits/sec.) of a channel by the optical frequency (in Hz) of that channel. A spectral density of 1 indicates that, for a given channel, the line rate and optical frequency are equal, so that each carries a bit of information. Existing telecommunications systems commonly operate at line rates of approximately 2.5 Gb/s to 40 Gb/s. At a line rate of 10 Gb/s, current Wavelength Division Multiplexed (WDM) (or Dense Wave Division Multiplexed (DWDM)) transmission systems achieve a spectral density of approximately 0.1 b/s/Hz. If the line rate is increased to 40 Gb/s, the spectral density increases to approximately 0.4 b/s/Hz, illustrating the advantages of increasing the line rate.

However, there is a trade-off involved in using increased line rates to improve spectral density. In particular, increased line rates typically result in a reduction in signal reach. For example, with the use of appropriate optical amplifiers, a signal reach of 2500 km has been demonstrated at a line rate of 2.488 Gb/s (equivalent to a SONET/SDH OC-48 signal). At a line rate of 40 Gb/s, the signal reach drops to approximately 1000 Km. This reduction in signal reach is explained by the fact that, as the line rate increases non-linear optical effects (e.g. self-phase modulation, optical dispersion, etc.) become progressively more significant, and cause increased bit error rates. In general, in order to keep the bit error rate below a tolerable threshold the distance that an optical signal is transmitted through a fiber before conversion to electronic form must be reduced.

Typically, the performance of optical fibers and amplifiers is non-linear across an optical spectrum of interest. This non-linear performance is manifested in, among other things, variations in the signal-to-noise ratio and signal gain (Q) of each channel. These variations tend to accumulate with each amplification stage and thus can become very large over the 15–20 spans of a fiber link. Since the length of each fiber link (i.e. the length of each span, and the number of spans before conversion to electronic form) is governed by the bit error rate of the lowest-performing channel, such high Q variations mean that most of the (higher performing) channels must operate with a shorter signal reach than would be indicated by their individual bit error rates. Accordingly, it is desirable to equalize performance across the channels.

Various methods of optical gain equalization are known in the art. See, for example, U.S. Pat. No. 6,091,538 issued to Takeda et al. on Jul. 18, 2000 and entitled Gain Equalizing Apparatus; and U.S. Pat. No. 6,097,535 issued to Terahara on Aug. 1, 2000 and entitled Method for Optical Amplification and System for Carrying Out the Method. Both of these patents use a variation of known Adaptive Optical Equalization techniques, in which the detected signal power is used to dynamically adjust the gain of an optical amplifier, to thereby minimize variations in the gain across multiple channels. Other known techniques involve the use of static or dynamic gain equalization filters, which operate by attenuating the optical signal power on channels with relatively high gain.

While each of the above methods are capable of reducing variations in gain, the physical properties of installed equalization devices are subject to a certain amount of variation, resulting in an unavoidable equalization error, typically on the order of approximately +0.2 dB. Over a link comprising 20 spans, this optical equalization error can accumulate to produce an uncompensated variation across the channels of as much as ±4 dB.

Accordingly, a method and apparatus that enables maximized signal reach by providing effective equalization across multiple channels remains highly desirable.

SUMMARY OF THE INVENTION

Accordingly, an object of the present invention is to provide a method an apparatus for conveying data signals through a multi-channel WDM network in which the effects of performance variations across the channels are effectively compensated.

Accordingly, an aspect of the present invention provides a method of optical equalization across N (an integer, N>1) channels of a multi-channel link of a communications network. Each one of M (an integer, M>1) parallel data signals are distributed across the N channels of the link, such that a substantially equal portion of each data signal is conveyed through each one of the N channels. Respective bit-streams received over the N channels are processed to recover the M data signals. As a result, performance variations between the N channels are optically equalized by averaging within each of the M data signals.

A further aspect of the present invention provides a method of conveying M (an integer, M>1) data signals across a multi-channel link of a communications network. At a transmitting end of the link, each one of the M data signals are distributed across the N channels of the link, such that a substantially equal portion of each data signal is conveyed through each one of the N channels. At a receiving end of the link, respective bit-streams received over the N channels are processed to recover the M data signals.

Another aspect of the present invention provides a system for equalization across N (an integer, N>1) channels of a multi-channel link of a communications network. The system comprises: means for distributing each one of M (an integer, M>1) parallel data signals across the N channels of the link, such that a substantially equal portion of each data signal is conveyed through each one of the N channels; and means for processing respective bit-streams received over the N channels to recover the M data signals. As a result, performance variations between the N channels are optically equalized by averaging within each of the M data signals.

Another aspect of the present invention provides an apparatus for enabling equalization across N (an integer, N>1) channels of a multi-channel link of a communications network, the apparatus comprising means for distributing each one of M (an integer, M>1) parallel data signals across the N channels of the link, such that a substantially equal portion of each data signal is conveyed through each one of the N channels.

Another aspect of the present invention provides a apparatus for enabling equalization across N (an integer, N>1) channels of a multi-channel link of a communications network, in which a substantially equal portion of each one of M (an integer, M>1) data signal is conveyed through each one of the N channels, the apparatus comprising means for processing respective bit-streams received over the N channels to recover the M parallel data signals.

Each data signal may be a Forward Error Correction (FEC) encoded data stream.

In embodiments of the invention, each one of the M data signals may be distributed across the N channels of the link by: substantially evenly dividing each one of the M data signals into N respective sub-signals; and interleaving one sub-signal of each data signal into a respective one of the N channels. Division of each data signal may be accomplished, for each data signal, by: partitioning the data signal into a sequential series of data units having a predetermined size; and forwarding each successive data unit, in turn, to a respective one of the N sub-signals. Each data unit may have a size of one or more bits.

In embodiments of the invention, a respective unique identifier is inserted into a predetermined location of each sub-signal, prior to interleaving the sub-signal into a respective one of the N channels. In such cases, processing a bit-stream received over a respective channel may comprise searching the bit stream to locate the unique identifier.

One sub-signal of each data signal may be interleaved into a respective one of the N channels using a conventional sequential interleaving process. Thus, a data unit can be sequentially selected from one sub-signal of each data signal, and each selected data unit then forwarded, in turn, to the channel.

In embodiments of the invention, a respective bit-stream received over each one of the N channels may be processed by: dividing each bit-stream to recover a respective sub-signal of each data signal; and interleaving respective recovered sub-signals of each data signal to recover each one of the M data signals. Division of each bit-stream may be accomplished, for each bit-stream, by: partitioning the bit-stream into a sequential series of data units having a predetermined size; and forwarding each successive data unit to a respective one of N recovered sub-streams.

In cases where each sub-signal includes a predetermined unique identifier, partitioning the bit-stream may be accomplished by searching the bit-stream to locate the unique identifier; and extracting one or more data units associated with the unique identifier from the bit-stream.

A conventional sequential interleaving process may be used to interleave respective recovered sub-signals of each data signal to recover each one of the M data signals. Thus, for each one of the M data signals, one data unit can be sequentially selected from each sub-signal of the data signal, successively selected data units are then appended to recover the original data signal.

An advantage of the present invention resides in the recognition that it is the bit error rate of data signals being transported through a fiber link, rather than the bit error rate of any one channel, that should be determinative of link length. By distributing each data signal evenly across two or more channels, the bit error rate for the signal is an average of the bit error rates of each involved channel. Thus the impact of any variations in channel performance is shared equally by each of the data streams, thereby diluting the effects of the lowest-performing channel and consequently allowing an increase in link length beyond that which would be indicated by the bit error rate of the lowest-performing channel.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and apparatus for optical equalization to improve signal reach by distributing two or more data signals across two or more channels of an optical link. At a receiving end of the optical link, data-streams conveyed through each of the channels are processed to recover the original data signals.

Figure 1:
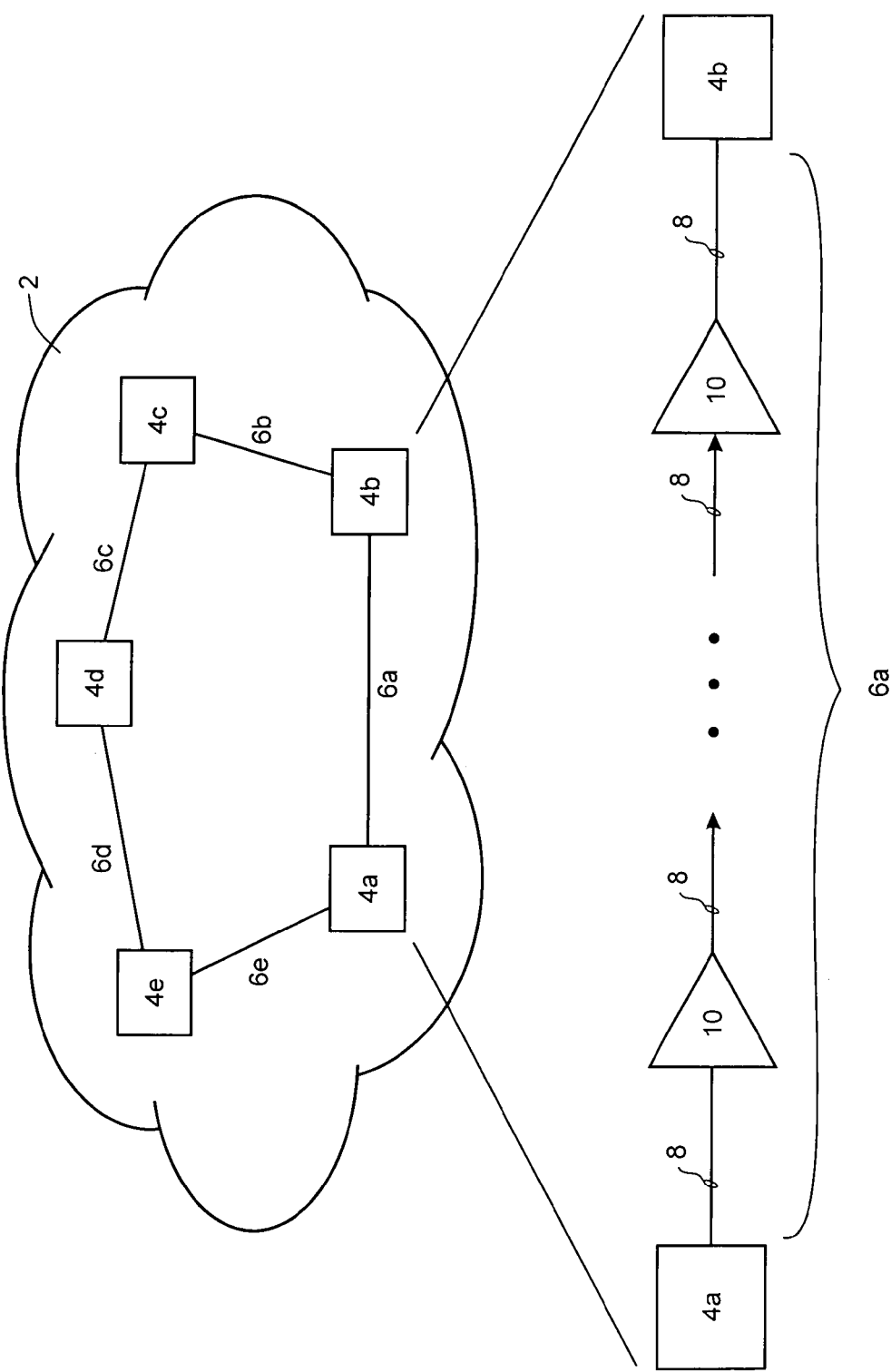
FIG. 1. is a block diagram schematically illustrating a communications network in which an embodiment of the present invention may be deployed.

FIG. 1 is a schematic diagram of a communications network 2 in which the present invention may be deployed. The network 2 includes a plurality of nodes 4a–e (which may be, for example, routers, cross-connects, regenerators or Add-Drop-multiplexors (ADMs)) interconnected by fibre links 6a–e. Each of the nodes 4a–e are preferably electro-optical nodes configured for wave division multiplex (WDM) and/or dense wave division multiplex (DWDM) transport of data traffic. For the purposes of the present invention, optical signals received at a node 4 from a fiber link 6 are assumed to be de-multiplexed and converted to electrical signals for signal regeneration and/or routing. Each fibre link 6a–e includes one or more fibre spans 8 coupled together by optical amplifiers 10. For the purposes of the present invention, optical signals received at an optical amplifier 10 from a fiber span 8 are assumed to be optically de-multiplexed and amplified without optical to electrical conversion.

Figure 2:
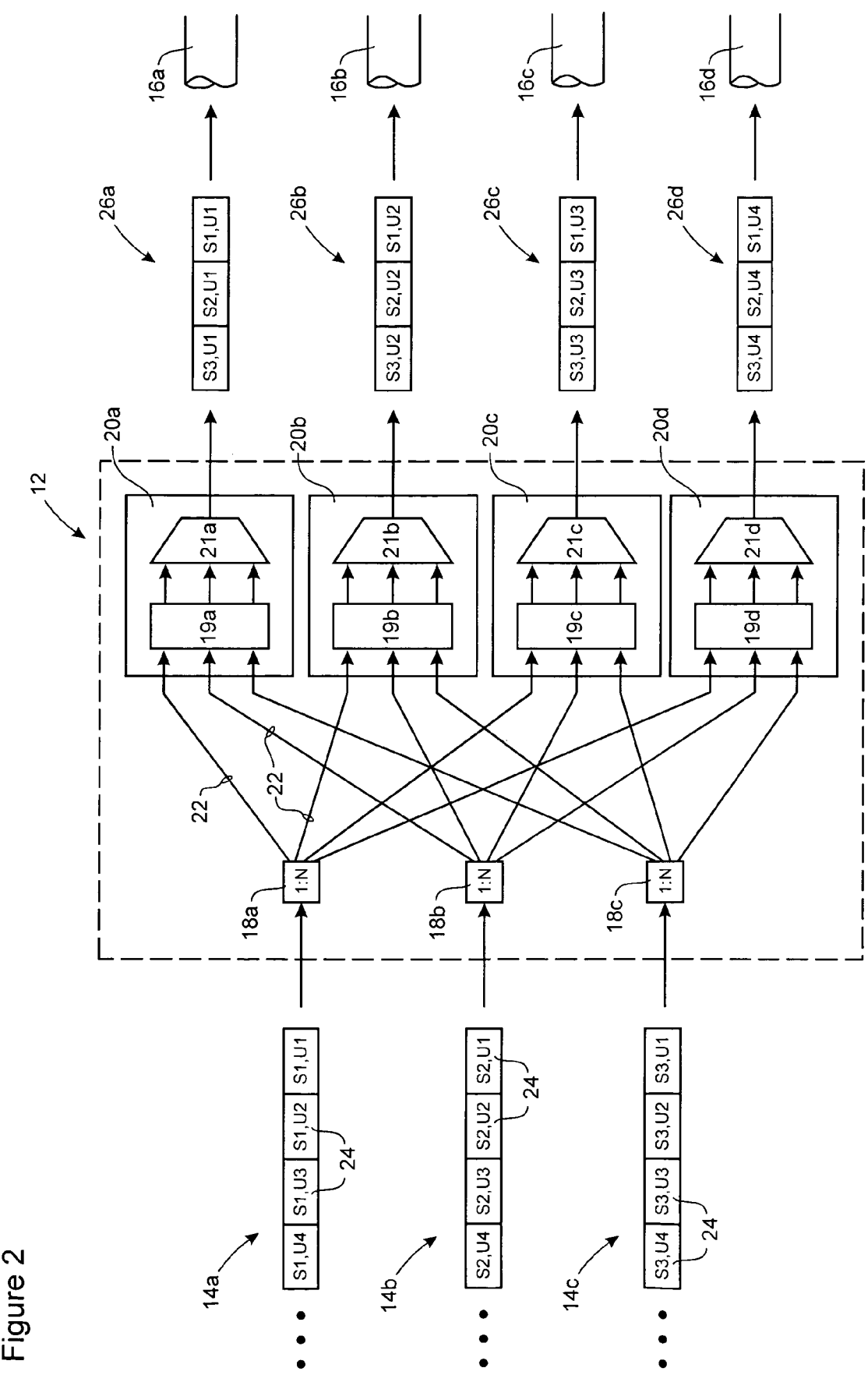
FIG. 2 is a block diagram schematically illustrating operation of a signal distribution unit 12 in accordance with an embodiment of the present invention, the signal distribution unit 12 being adapted to operate in a transmitting end node of a fiber link.

FIG. 2 is a block diagram schematically illustrating operations of a signal distribution unit 12 in accordance with an aspect of the present invention. The signal distribution unit 12 may be implemented as hardware and/or software within each transmitting end node 4a–e. In a hardware implementation, the signal distribution unit 12 may be an application specific integrated circuit (ASIC), or may be incorporated into a larger ASIC such as, for example, a forward error correction (FEC) ASIC. In either case, the signal distribution unit 12 operates to distribute M (where M is an integer, and M>1) data signals 14 (in the example shown in FIG. 2, M=3) across N (where N is an integer, and N>1) channels 16 (in the example shown in FIG. 2, N=4). The channels 16 can then be routed through conventional signal transmission circuits (not shown) which perform electro/optical conversion and optical multiplexing of the channels 16 into the fiber links 6a–e in a manner known in the art. For example, known signal multiplexing methods may be utilized to multiplex the channels 16 onto respective different wavelengths within the same WDM or DWDM fiber, respective wavelengths within two or more WDM or DWDM fibers, or respective single-wavelength fibers. With any of these approaches, it is also possible to use a Code Division Multiple Access (CDMA) encoding system to combine and transmit data signals within the channels 16.

In general, the signal distribution unit 12 comprises at least M signal dividers 18a–c, and at least N interleavers 20a–d. Each signal divider 18a–c divides a respective data signal 14a–c into N sub-streams 22 (i.e. one sub-stream 22 for each channel 16). As illustrated in FIG. 2, one method by which this may be accomplished is to divide each data signal 14 into a sequential series of data units 24 of a predetermined length. The length of each data unit is arbitrary, and may be as short as a single bit. The signal divider 18 then forwards each successive data unit 24 of a respective data signal 14 to a respective one of the sub-streams 22, in turn, so that each sub-stream 22 includes a substantially equal proportion of the original data signal 14. Each sub-stream 22 from a data signal 14 is forwarded to a respective one of the interleavers 20a–b, so that each channel 16 carries one sub-stream 22 from (and thus a substantially equal portion of) each data signal 14.

Each interleaver 20, which may be implemented in hardware and/or software, comprises a sub-stream processor 19 and a sequential interleaving multiplexor 21. The sub-stream processor operates to insert a unique sub-stream identifier into each of the sub-streams 22 received by the interleaver 20, prior to their being interleaved into a respective channel 16. The sub-streamidentifier serves to enable successful discrimination and separation of the sub-streams from a respective channel 16 at a downstream node 4. The sub-streamidentifier preferably comprises a unique, n-bit word, which is inserted into a respective sub-stream 22 at a predetermined frequency. The length (i.e. number n of bits) of the sub-streamidentifier, and the insertion frequency are implementation specific, and may be varied as required. In order to provide reliable identification of the sub-streamidentifier at a downstream node 4, a sub-streamidentifier of at least 10 bits is preferred. In a high-noise environment, a sub-stream identifier of 20 bits or more may be required in order to obtain reliable separation of the sub-streams 22. Additionally, it is preferable to ensure that the insertion frequency of the sub-streamidentifier is sufficiently high to enable accurate compensation for noise and signal jitter, but should not be so high as to introduce an unnecessary overhead into the sub-stream. In general, an insertion frequency of about 8 kHz should yield satisfactory results in most cases.

The sequential interleaving multiplexor 21 operates in a manner known in the art to interleave the sub-streams 22 (including their respective sub-stream identifiers) into a respective channel 16. The order in which bits of each sub-stream 22 are interleaved into a respective channel 16 is predetermined, to facilitate recovery of the original data signals 14 at a receiving end node 46.

In the embodiment illustrated in FIG. 2, the signal distribution unit 12 is configured to distribute M=3 data signals 14a–c across N=4 channels 16a–d. Thus the signal distribution unit 12 of FIG. 2 comprises M=3 signal dividers 18a–c, each of which divides its respective data signal 14 into N=4 sub-streams 22. Similarly, N=4 interleavers 20a–d are provided for interleaving respective sub-streams 22 from each data signal 14 into a respective one of the channels 16. Thus, interleavor 20a operates to interleave sub-stream U1 of each of incoming data signals 14a–c to create a serial composite data-stream 26a on channel 16a. Interleavor 20b operates to interleave sub-stream U2 of each of incoming data streams 14a–c to create a serial composite data-stream 26b on channel 16b. Interleavor 20c operates to interleave sub-stream U3 of each of data streams 14a–c to create a serial composite data-stream 26c on channel 16c. Finally, interleavor 20d operates to interleave sub-stream U4 of each of data signals 14a–c to create a serial composite data-stream 26d on channel 16d.

As mentioned above, the number (M) of data signals 14, and the number (N) of channels are arbitrary within a range governed by physical constraints of the networks. Thus, it will be appreciated that the signal distribution unit 12 of FIG. 2 may be equipped with a number of signal dividers 18 required to handle a desired number of data signals 14. Similarly, the distribution unit 12 is equipped with a number of interleavers 20 interconnected with the signal dividers 18, to distribute data signals 14 across a desired number of channels 16. Advantages of the present invention may be obtained with distribution across as few as two channels 16. However, in practice, it will generally be preferable to distribute 2 or more signals across a larger number of channels which, depending on the specifics of a particular implementation, may be less than, equal to, or greater than the number of data signals 14. The method and apparatus of the invention are transparent to the protocol of the data signals 14, and so the protocol may be selected as required for a specific implementation. For example, if desired the data signals 14 may be forward error correction (FEC) encoded SONET/SDH signals.

Figure 3:
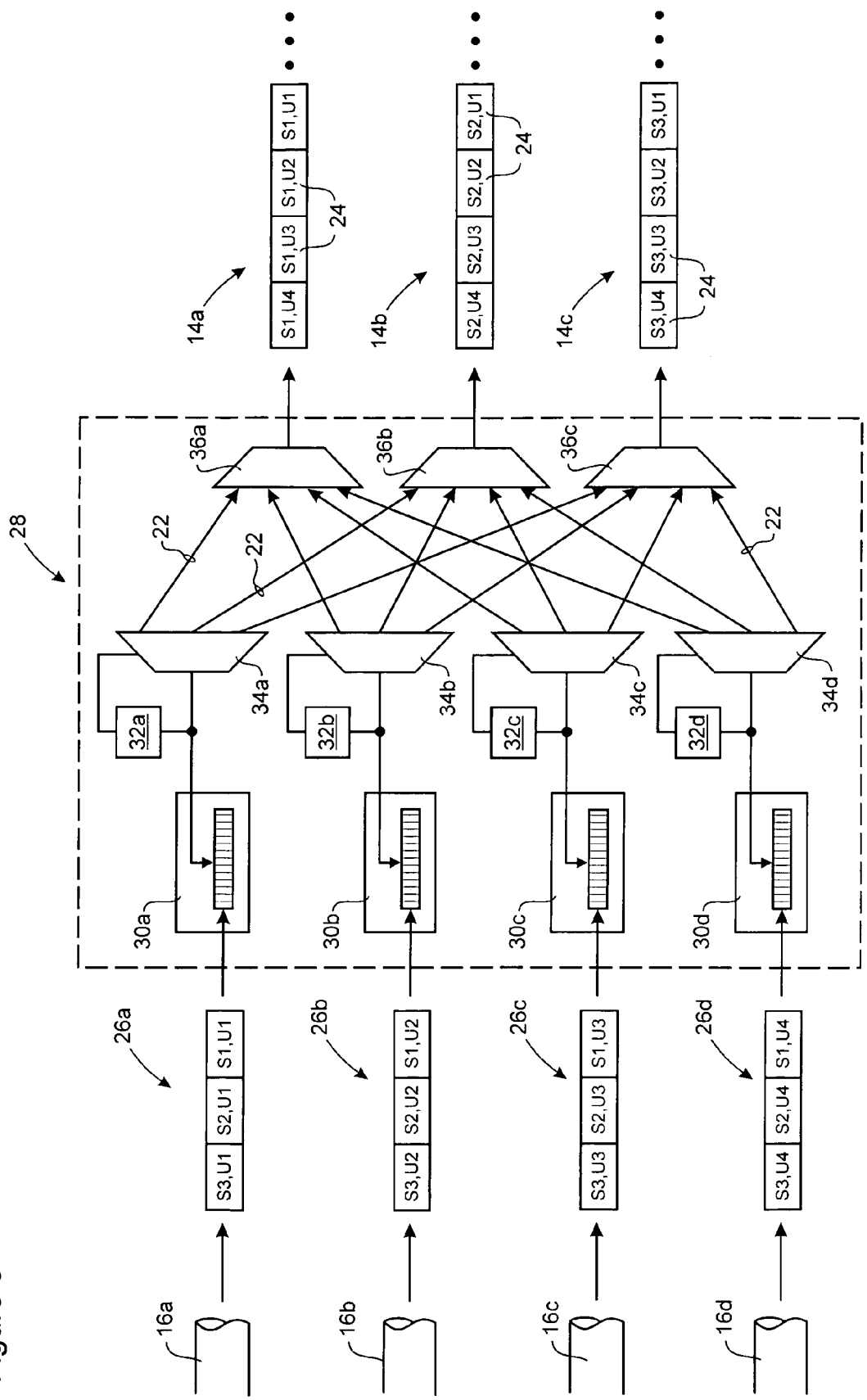
FIG. 3 is a block diagram schematically illustrating operations of a signal regeneration circuit in accordance with an embodiment of the present invention, the signal regeneration circuit being adapted to operate in a receiving end node of a fiber link.

The signal distribution process described above with respect to FIG. 2 is fully reversible to recover the original data signals 14. FIG. 3 is a block diagram of a signal recovery unit 28, which is implemented in each receiving end node 4a–e. The signal recovery unit 28 shown in FIG. 3 can be implemented in hardware and/or software downstream of conventional optical demultiplexing and opto/electrical conversion circuits, which operate to optically demultiplex the channels 16a–d from a fiber link 6, and convert each composite data-stream 26a–d into electronic form for processing. Conventional clock recovery and signal regeneration circuits (not shown) may also be implemented upstream of the signal recovery circuit 28 shown in FIG. 3.

The signal recovery unit 28 generally includes at least N parallel elastic buffers 30a–d, each of which is arranged to receive a respective composite data-stream 26 from one of the channels 16. The elastic buffers 30a–d cooperate to de-skew the composite data-streams 26a–d, and thus compensate for propagation delay differences between each of the channels. Each of the de-skewed composite data-signals 26a–d is then passed to a respective framer 32 and demultiplexor 34. The framer 32 analyses the respective composite data-stream 26 to detect the sub-stream identifiers of each of the sub-streams 22 contained in the composite data-stream 26, and generates a synchronization signal which is used to control the operation of the respective demultiplexor 34. Using the synchronization signal, in combination with the known interleaving sequence of the interleavers 20a–d, each demultiplexor 30a–d operates to demultiplex its respective composite data-stream 26, to recover one sub-stream 22 of each data signal 14. The sub-streams 22 of each data signal 14 are forwarded (one from each demultiplexor 30) to a one of M multiplexors 32a–c which multiplex the sub-streams 22 to recover the respective data signals 14.

As shown in FIGS. 2 and 3, a data stream 14 (which may be FEC encoded) is evenly divided into sub-streams 22, which are interleaved and transmitted through a fiber link within respective parallel channels 16. At a receiving end node 4b, the sub-streams 22 are demultiplexed from their respective channels 16 and then multiplexed together to recover the original data signals 14. Between transmitting and receiving end nodes 4, each composite data-stream 26 transits a fiber link 6 within a respective one of the N channels 16. Consequently, each composite data-stream 26 is subject to optical amplification gain, attenuation, dispersion and noise in accordance with the optical performance of the channel 16 through which it is conveyed. When the composite data-streams are demultiplexed, the respective sub-streams 22 express a bit error rate that is associated with the optical characteristics of the channel on which it was conveyed.

Multiplexing of the sub-streams 22 in the signal recovery circuit 28 by sub-stream multiplexers 32 yields a recovered data signal 14 having an aggregate bit error rate that approximates an average of the bit error rates of each channel 16 through which the composite data-streams 26 were transmitted. Since each of the transmitted data signals 14 are preferably equally distributed over the respective channels 16, this averaging of bit error rates affects each of the data signals 14 approximately equally. Thus, optical equalization across the N channels of the fiber link 6a is achieved by averaging the effects of optical performance variations across M parallel data signals conveyed through the link 6.

The present invention therefore provides a method and apparatus for achieving optical equalization across multiple channels of a multi-channel fibre link 6a, thereby extending signal reach by distributing the effect related to channel performance.

The embodiment(s) of the invention described above is (are) intended to be exemplary only. The scope of the invention is therefore intended to be limited solely by the scope of the appended claims.

We claim:

1. A method of equalization across N channels, where N is an integer greater than 1, of a multi-channel link of communications network, comprising steps of:
   a) distributing each one of M data signals, where M is an integer greater than 1, across the N channels of the link, such that a substantially equal proportion of each data signal is conveyed through each one of the N channels as a composite data-stream; and
   b) processing the composite data-streams conveyed through the N channels to recover the M data signals.

2. A method as claimed in claim 1, wherein each data signal is a Forward Error Correction (FEC) encoded data stream.

3. A method as claimed in claim 1, wherein the step of distributing each one of the M data signals across the N channels of the link comprises steps of:
   a) dividing each one of the M data signals into N respective sub-streams of substantially equal length; and
   b) interleaving the sub-streams into respective ones of the N channels.

4. A method as claimed in claim 3, wherein the step of dividing each data signal comprises a step of inserting a respective predetermined unique identifier into each sub-stream.

5. A method as claimed in claim 3, wherein the step of dividing each data signal comprises, steps of:
   a) partitioning, the data signal into a sequential series of data units having a predetermined length; and
   b) forwarding each successive data unit, in turn, to a respective sub-stream.

6. A method as claimed in claim 5, wherein each data unit has a length of one or more bits.

7. A method as claimed in claim 5, wherein the step of interleaving one sub-stream of each data signal into a respective one of the N channels comprises using a sequential interleaving process to:
   a) select a data unit from one sub-stream of each data signal in a predetermined order; and
   b) forward each selected data unit, in turn, to the channel.

8. A method as claimed in claim 1, wherein the step of processing a composite data-stream conveyed through each of the N channels comprises steps of:
   a) dividing each composite data-stream to recover respective sub-streams of each data signal; and
   b) interleaving respective recovered sub-streams of each data signal to recover each one of the M data signals.

9. A method as claimed in claim 8, wherein the step of dividing each composite data-stream comprises steps of:
   a) partitioning the composite data-stream into a sequential series of data units having a predetermined length; and
   b) forwarding each successive data unit to a respective one of N recovered sub-streams.

10. A method as claimed in claim 9, wherein each substream within the composite data stream includes a respective predetermined unique identifier, and the step of partitioning the composite data-stream comprises the steps of:
    a) searching the composite data-stream to locate a unique identifier; and
    b) extracting one or more data units associated with the unique identifier from the composite data stream.

11. A method as claimed in claim 9, wherein each data unit has a length of one or more bits.

12. A method as claimed in claim 9, wherein the step of interleaving respective recovered sub-signals of each data signal to recover each one of the M data signals comprises using a sequential interleaving process to:
    a) select one data unit from each sub-signal of the data signal; and
    b) append successively selected data units to recover the original data signal.

13. A method of conveying M data signals, where M is an integer greater than 1, across a multi-channel link of communications network, the method comprising steps of:
   a) at a transmitting end of the link, distributing each one of the M data signals across the N channels of the link, where N is an integer greater than 1, such that a substantially equal proportion of each data signal is conveyed through each one of the N channels as a composite data-stream; and
   b) at a receiving end of the link, processing respective composite data-streams conveyed through the N channels to recover the M data signals.

14. A method as claimed in claim 13, wherein each data signal is a Forward Error Correction (FEC) encoded data stream.

15. A method as claimed in claim 13, wherein the step of distributing each one of the M data signals across the N channels of the link comprises steps of:
   a) dividing each one of the M data signals into N respective sub-streams of substantially equal lengths; and
   b) interleaving one sub-stream of each data signal into a respective one of the N channels.

16. A method as claimed in claim 15, wherein the step of dividing each data signal comprises a step of inserting a respective predetermined unique identifier into each sub-stream.

17. A method as claimed in claim 15, wherein the step of dividing each data signal comprises, for each data signal, the steps of:
   a) partitioning the data signal into a sequential series of data units having a predetermined length; and
   b) forwarding each successive data unit, in turn, to a respective one of the N channels.

18. A method as claimed in claim 17, wherein each data unit has a size of one or more bits.

19. A method as claimed in claim 17, wherein the step of interleaving one sub-signal of each data signal into a respective one of the N channels comprises using a sequential interleaving process to:
   a) select a data unit from one sub-signal of each data signal; and
   b) forward each selected data unit, in turn, to the channel.

20. A method as claimed in claim 13, wherein the step of processing a composite data-stream received over each of the N channels comprises steps of:
   a) dividing each composite data-stream to recover respective sub-streams of each data signal; and
   b) interleaving respective recovered sub-streams of each data signal to recover each one of the M data signals.

21. A method as claimed in claim 20, wherein the step of dividing each composite data-stream comprises steps of:
   a) partitioning the composite data-stream into a sequential series of data units having a predetermined length; and
   b) forwarding each sucessive data unit to a respective one of N recovered sub-streams.

22. A method as claimed in claim 21, wherein each substream within the composite data stream includes a respective predetermined unique identifier, and the step of partitioning the composite data-stream comprises the steps of:
   a) searching the composite data-stream to locate a unique identifier; and
   b) extracting one or more data units associated with the unique identifier from the composite data stream.

23. A method as claimed in claim 21, wherein each data unit has a length of one or more bits.

24. A method as claimed in claim 21, wherein the step of interleaving respective recovered sub-signals of each data signal to recover each one of the M data signals comprises using a sequential interleaving process to
   a) select one data unit from each sub-signal of the data signal; and
   b) append successively selected data units to recover the original data signal.

25. A system for optical equalization across N channels, where N is an integer greater than 1, of a multi-channel link of communications network, the system comprising:
   a) means for distributing each one of M parallel data signals, where M is an integer greater than 1, across the N channels of the link, such that a substantially equal proportion of each data signal is conveyed through each one of the N channels as a composite data-stream; and
   b) means for processing respective composite data-streams conveyed through the N channels to recover the M data signals.

26. A system as claimed in claim 25, wherein each data signal is a Forward Error Correction (FEC) encoded data stream.

27. A system as claimed in claim 25, wherein the means for distributing each one of the M data signals across the N channels of the link comprises:
   a) means for dividing each one of the M data signals into N respective sub-signals of substantially equal length; and
   b) means for interleaving sub-signals into respective ones of the N channels.

28. A system as claimed in claim 27, wherein the means for dividing each data signal comprises means for inserting a respective predetermined unique identifier into each sub-stream.

29. A system as claimed in claim 27, wherein the means for dividing each data signal into sub-streams comprises:
   a) a means for partitioning the data signal into a sequential series of data units having a predetermined length; and
   b) means for forwarding each successive data unit, in turn, to a respective one of the N channels.

30. A system as claimed in claim 29, wherein each data unit has a length of one or more bits.

31. A system as claimed in claim 29, wherein the means for interleaving one sub-stream of each data signal into a respective one of the N channels comprises, for each channel, a sequetial interleaving multiplexor adapted to:
   a) select a data unit from one sub-signal of each data signal; and
   b) forward each selected data unit, in turn, to the channel.

32. A system as claimed in claim 25, wherein the means for processing a respective composite data-stream received over each of the N channels comprises:
   a) means for dividing each composite data-stream to recover respective sub-streams of each data signal; and
   b) means for interleaving respective recovered sub-signals of each data signal to recover each one of the M data signals.

33. A system as claimed in claim 32, wherein the means for dividing each composite data-stream comprises:
   a) means for partitioning the bit-stream into a sequential series of data units having a predetermined size; and
   b) means for forwarding each successive data unit to a respective one of N recovered sub-streams.

34. A system as claimed in claim 33, wherein each substream within the composite data stream includes a respective predetermined unique identifier, and the means for partitioning the composite data-stream comprises:

a) means for searching the composite data-stream to locate a unique identifier; and
b) means for extracting one or more data units associated with the unique identifier from the composite data stream.

35. A system as claimed in claim 33, wherein each data unit has a size of one or more bits.

36. A system as claimed in claim 33, wherein the means for interleaving respective recovered sub-signals of each data signal to recover each one of the M data signals comprises, for each data signal, a respective sequential interleaving multiplexor adapted to:
   a) select one data unit from each sub-stream of the data signal; and
   b) append successively selected data units in a predetermined order to recover the original data signal.

37. An apparatus for enabling optical equalization across N, where N is an integer greater than 1, channels of a multi-channel link of a communications network, the apparatus comprising:
   means for dividing each one of M, where M is an integer greater than 1, parallel data signals into N respective sub-streams of substantially equal length; and
   means for interleaving the sub-streams into respective ones of N channels of the link, such that a substantially equal portion of each data signal is conveyed through each one of the N channels.

38. An apparatus as claimed in claim 37, wherein each data signal is a Forward Error Correction (FEC) encoded data stream.

39. An apparatus as claimed in claim 37, wherein the means for dividing each data signal comprises means for inserting a respective predetermined unique identifier into each sub-stream.

40. An apparatus as claimed in claim 37, wherein the means for dividing each data signal into sub-streams comprises:
   a) means for partitioning the data signal into a sequential series of data units having a predetermined length; and
   b) means for forwarding each successive data unit, in turn, to a respective one of the N channels.

41. An apparatus as claimed in claim 40, wherein each data unit has a length of one or more bits.

42. An apparatus as claimed in claim 40, wherein the means for interleaving one sub-stream of each data signal into a respective one of the N channels comprises, for each one of the N channels, a sequential interleaving multiplexor adapted to:
   a) select a data unit from one sub-signal of each data signal; and
   b) forward each selected data unit, in turn, to the channel.

43. An apparatus for enabling optical equalization across N channels, where N is an integer greater than 1, of a multi-channel link of a communications network, in which a substantially equal portion of each one of M parallel data signals, where M is an integer greater than 1, is conveyed through each one of the N channels, the apparatus comprising.

44. An apparatus as claimed in claim 43, wherein the means for dividing each composite data-stream comprises:
   a) means for partitioning the bit-stream into a sequential series of data units having a predetermined size; and
   b) means for forwarding each successive data unit to a respective one of N recovered sub-streams.

45. An apparatus as claimed in claim 44, wherein each sub-stream within the composite data stream includes a respective predetermined unique identifier, and the means for partitioning the composite data-stream comprises:
   a) means for searching the composite data-stream to locate a unique identifier; and
   b) means for extracting one or more data units associated with the unique identifier from the composite data stream.

46. An apparatus as claimed in claim 44, wherein each data unit has a size of one or more bits.

47. An apparatus as claimed in claim 44, wherein the means for interleaving respective recovered sub-signals of each data signal to recover each one of the M data signals comprises, for each one of the M data signals, a respective sequential interleaving multiplexor adapted to:
   a) sequentially select one data unit from each sub-stream of the data signal; and
   b) append successively selected data units in a predetermined order to recover the original data signal.

* * * * *

UNITED STATES PATENT AND TRADEMARK OFFICE
CERTIFICATE OF CORRECTION

| | | |
|---|---|---|
| PATENT NO. | : 7,149,432 B1 | |
| APPLICATION NO. | : 09/722339 | |
| DATED | : December 12, 2006 | |
| INVENTOR(S) | : Roland A. Smith and Kim B. Roberts | |

It is certified that error appears in the above-identified patent and that said Letters Patent is hereby corrected as shown below:

Column 7, line 62, "of equalization" should read --of optical equalization--

Column 7, line 64, "communications network" should read --an optical communications network--

Column 8, line 4, "M data signals." should read -- M data signals, such that optical performance variations between the N channels of the link are equalized by averaging within each of the M data signals.--

Column 9, line 2, "link of communications" should read --link of an optical communications--

Column 10, line 11, "of communications" should read --of an optical communications--

Column 10, line 19, "M data signals." should read --M data signals, such that optical performance variations between the N channels of the link are equalized by averaging within each of the M data signals.--

Column 12, line 14, "N channels," should read --N channels as a composite data stream,--

UNITED STATES PATENT AND TRADEMARK OFFICE
CERTIFICATE OF CORRECTION

PATENT NO. : 7,149,432 B1
APPLICATION NO. : 09/722339
DATED : December 12, 2006
INVENTOR(S) : Roland A. Smith and Kim B. Roberts It is certified that error appears in the above-identified patent and that said Letters Patent is hereby corrected as shown below:

Column 12, line 15, "comprising." should read --comprising:
a)   means for dividing each composite data-stream to recover respective sub-streams of each data signal; and b)   means for interleaving respective recovered sub-streams of each data signal to recover each one of the M data signals.--

Signed and Sealed this

Twentieth Day of March, 2007

JON W. DUDAS
*Director of the United States Patent and Trademark Office*